(12) United States Patent
Martinez et al.

(10) Patent No.: US 10,540,491 B1
(45) Date of Patent: Jan. 21, 2020

(54) VIRTUAL AND AUGMENTED REALITY SIGNATURES

(71) Applicant: Wells Fargo Bank, N.A., San Francisco, CA (US)

(72) Inventors: Andrew L. Martinez, San Francisco, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 427 days.

(21) Appl. No.: 15/334,084

(22) Filed: Oct. 25, 2016

(51) Int. Cl.
| | | |
|---|---|---|
| *G06F 7/04* | (2006.01) |
| *G06F 21/36* | (2013.01) |
| *G06K 9/00* | (2006.01) |
| *G06F 3/01* | (2006.01) |
| *G06T 19/20* | (2011.01) |

(52) U.S. Cl.
CPC ............. *G06F 21/36* (2013.01); *G06F 3/013* (2013.01); *G06K 9/00161* (2013.01); *G06K 9/00214* (2013.01); *G06K 9/00355* (2013.01); *G06T 19/20* (2013.01); *G06T 2219/2016* (2013.01)

(58) Field of Classification Search
CPC ....... G06F 21/32; G06F 21/34; H04L 63/0861
USPC ........................................................ 726/18
See application file for complete search history.

(56) References Cited

U.S. PATENT DOCUMENTS

| | | |
|---|---|---|
| 5,222,138 A | 6/1993 | Balabon et al. |
| 8,358,320 B2 | 1/2013 | Zhou et al. |
| 8,819,812 B1 * | 8/2014 | Weber ..................... G06F 3/017 |
| | | 726/19 |
| 8,897,511 B2 | 11/2014 | Haid |
| 9,158,375 B2 * | 10/2015 | Maizels ................ G06T 19/006 |
| 9,251,411 B2 | 2/2016 | Todeschini |
| 9,292,731 B2 | 3/2016 | Carrizo et al. |

(Continued)

FOREIGN PATENT DOCUMENTS

WO    2016073185 A1    5/2016

OTHER PUBLICATIONS

Sayeed et al., Virtual Reality Based Dynamic Signature Verification Using Data glove, International Conference on Intelligent and Advanced Systems 2007, 2007, 5 pages.

(Continued)

*Primary Examiner* — Samson B Lemma
(74) *Attorney, Agent, or Firm* — Merchant & Gould P.C.

(57) ABSTRACT

A method implemented on a visual computing device to authenticate one or more users includes receiving a first three-dimensional pattern from a user. The first three-dimensional pattern is sent to a server computer. At a time of user authentication, a second three-dimensional pattern is received from the user. The second three-dimensional pattern is sent to the server computer. An indication is received from the server computer as to whether the first three-dimensional pattern matches the second three-dimensional pattern within a margin of error. When the first three-dimensional pattern matches the second three-dimensional pattern within the margin of error, the user is authenticated at the server computer. When the first three-dimensional pattern does not match the second three-dimensional pattern within the margin of error, user is prevented from being authenticated at the server computer.

13 Claims, 12 Drawing Sheets

(56) References Cited

U.S. PATENT DOCUMENTS

| | | |
|---|---|---|
| 9,953,149 B2 * | 4/2018 | Tussy ................ G06K 9/00288 |
| 2007/0222746 A1 | 9/2007 | LeVine |
| 2008/0040692 A1 | 2/2008 | Sunday et al. |
| 2008/0192005 A1 | 8/2008 | Elgoyhen et al. |
| 2008/0273764 A1 | 11/2008 | Scholl |
| 2013/0342571 A1 | 12/2013 | Kinnebrew et al. |
| 2014/0201666 A1 | 7/2014 | Bedikian et al. |
| 2015/0220157 A1 | 8/2015 | Marggraff et al. |
| 2015/0254471 A1 | 9/2015 | You et al. |
| 2016/0063235 A1 * | 3/2016 | Tussy ..................... G06F 21/32 726/6 |

OTHER PUBLICATIONS

Biometric Signature ID, Multi-factor Authentication Using Gesture Biometrics, https://www.biosig-id.com/, Jun. 2016, 9 pages.

Orion, Leap Motion Developers, https://developer.leapmotion.com/orion, Jun. 2016, 3 pages.

Kumar et al., Hand Data Glove: A Wearable Real-Time Device for Human-Computer Interaction, International Journal of Advanced Science and Technology, vol. 43, Jun. 2012, 12 pages.

Gloveone, The haptic glove to feel & touch real virtual reality, https://www.gloveonevr.com/, Jun. 2016, 7 pages.

* cited by examiner

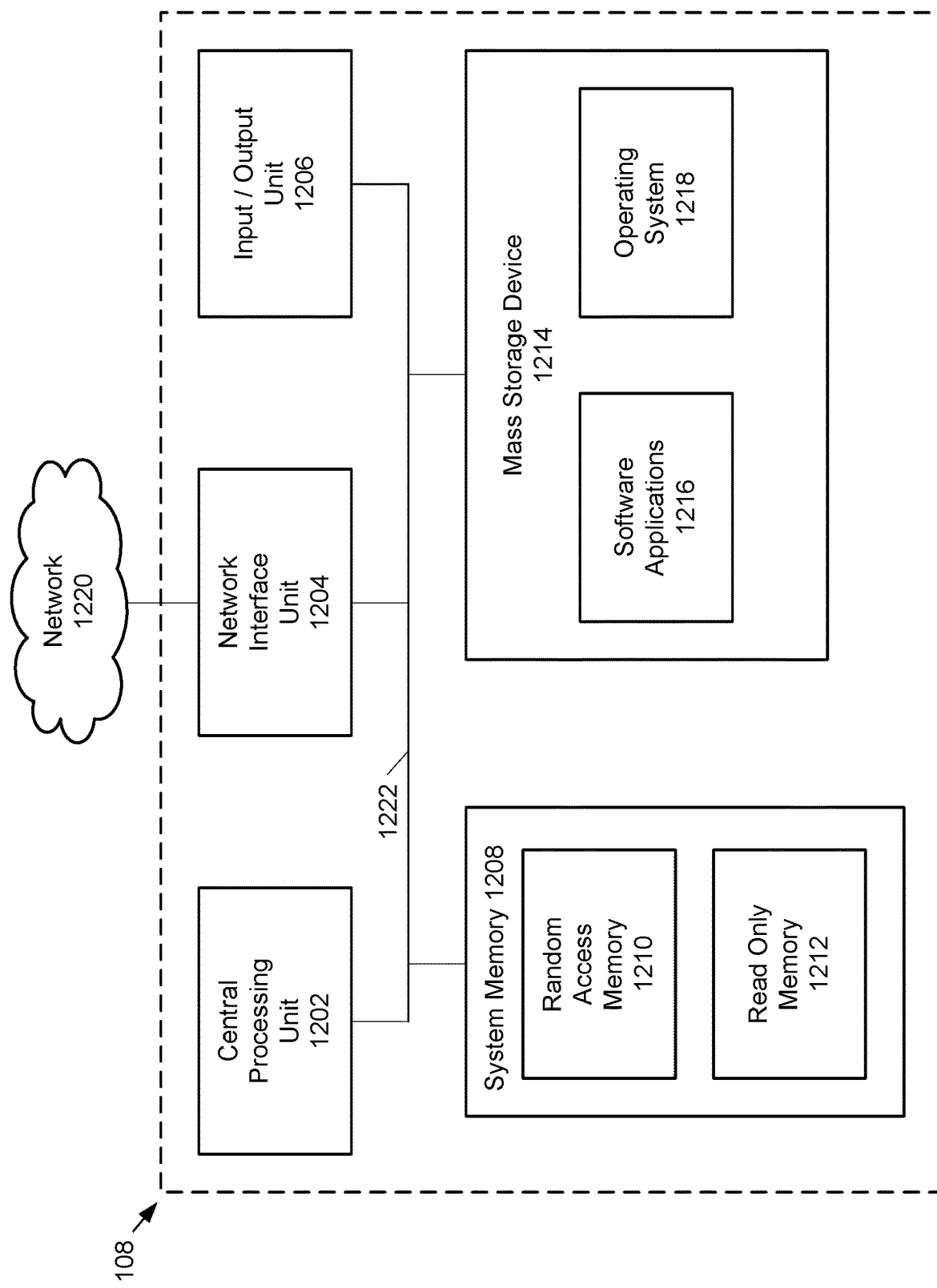

VIRTUAL AND AUGMENTED REALITY SIGNATURES

BACKGROUND

Authentication of a user is often required before the user can perform various tasks, such as accessing an electronic computing device or consummating a transaction. The authentication can be used to verify an identity of the user. A common method of authentication is for a user to enter a user ID and password to access the electronic computing device.

Another method of authentication is for a user to enter a signature, for example, on a touch screen device. The signature can comprise the user signing his/her name on the touch screen device. The entered signature can be compared with a previously stored signature to authenticate the user.

SUMMARY

Embodiments of the disclosure are directed to a method implemented on a visual computing device to authenticate one or more users, the method comprising: using the visual computing device, receiving a first three-dimensional pattern from a first user; sending the first three-dimensional pattern to a server computer; at a time of user authentication, receiving a second three-dimensional pattern from the first user; sending the second three-dimensional pattern to the server computer; receiving an indication from the server computer as to whether the first three-dimensional pattern matches the second three-dimensional pattern within a margin of error; when the first three-dimensional pattern matches the second three-dimensional pattern within the margin of error, authenticating the first user at the server computer; and when the first three-dimensional pattern does not match the second three-dimensional pattern within the margin of error, preventing authentication of the first user at the server computer.

In another aspect a method implemented on a virtual reality (VR) or augmented reality (AR) device to authenticate a user of a server computer comprises: using a camera on the VR or AR device, capturing one or more first hand gestures of the user, the one or more first hand gestures forming a first signature of the user; sending the first signature to the server computer; at a time of user authentication at the server computer, capturing one or more second hand gestures of the user, the one or more second hand gestures forming a second signature of the user; sending the second signature to the server computer; receiving an indication from the server computer as to whether the first signature matches the second signature within a margin of error; when the first signature matches the second signature within the margin of error, authenticating the user at the server computer; and when the first signature does not match the second signature within the margin of error, preventing authentication of the user at the server computer.

In yet another aspect, an augmented reality (AR) device comprises: a processing unit; and system memory, the system memory including instructions which, when executed by the processing unit, cause the AR device to: receive a first three-dimensional pattern from a first user, the first three-dimensional pattern comprising a first orientation of two or more first virtual objects, at least one of the two or more first virtual objects being of a different size or shape than another of the two or more first virtual objects; receive a second three-dimensional pattern from a second user, the second three-dimensional pattern comprising the first three-dimensional pattern and one or more second virtual objects, at least one of the second virtual objects being contiguous to one or more of the first virtual objects in the first three-dimensional pattern; send the first three-dimensional pattern and the second three-dimensional pattern to a server computer; at a time or user authentication, receive a third three-dimensional pattern from the first user and a fourth three-dimensional pattern from the second user, the fourth three-dimensional pattern including the third three-dimensional pattern; send the third three-dimensional pattern and the fourth three-dimensional pattern to the server computer; receive a first indication from the server computer as to whether the fourth three-dimensional pattern matches the second three-dimensional pattern; and when the fourth three-dimensional pattern matches the second three-dimensional pattern within a predetermined margin of error, authenticate the first user and the second user at the server computer.

The details of one or more techniques are set forth in the accompanying drawings and the description below. Other features, objects, and advantages of these techniques will be apparent from the description, drawings, and claims.

DESCRIPTION OF THE DRAWINGS

FIG. 12 shows example physical components of the server computer of FIG. 1.

DETAILED DESCRIPTION

Figure 1:
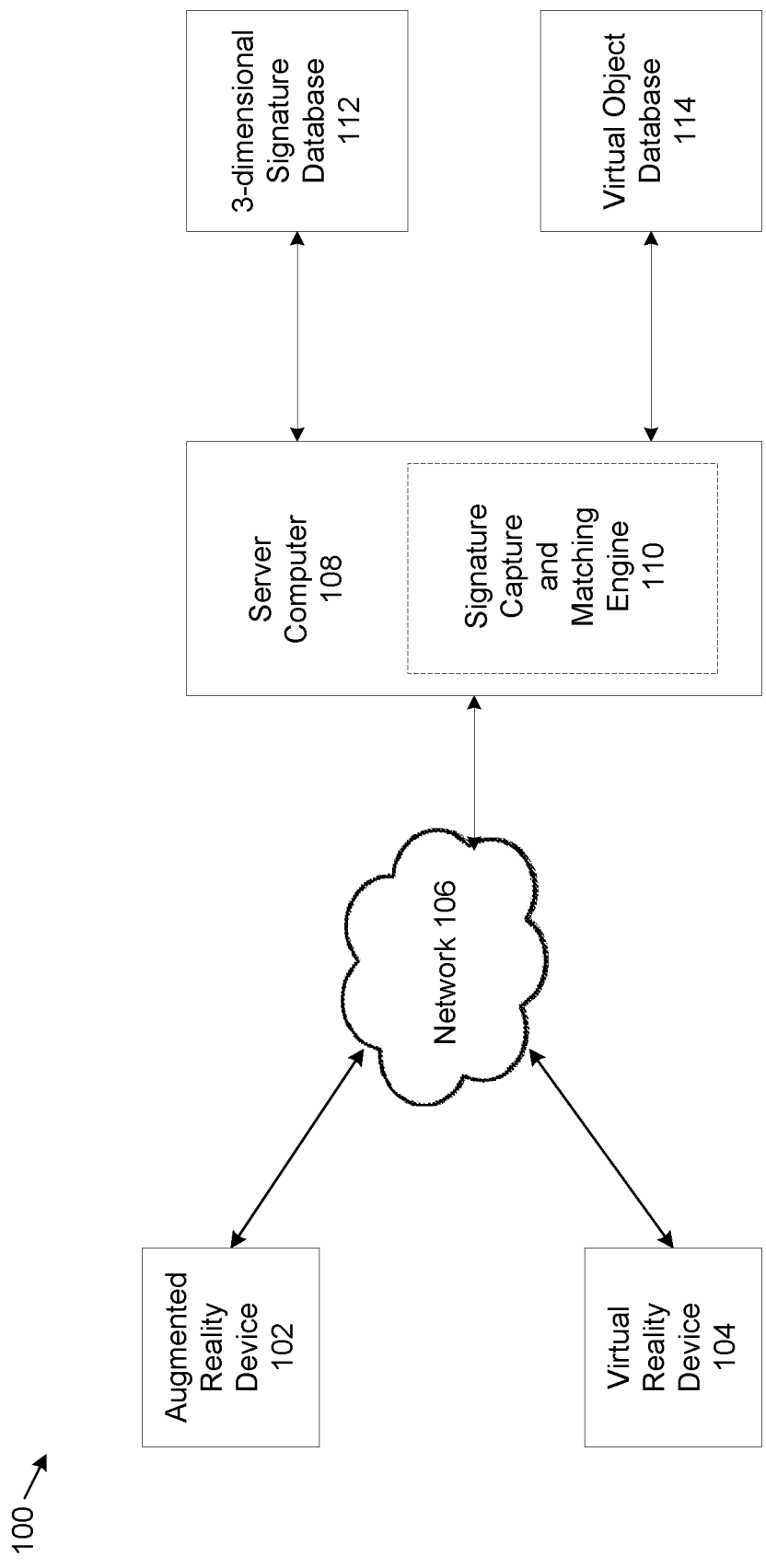
FIG. 1 shows an example system that supports three-dimensional augmented reality and virtual reality signatures.

The present disclosure is directed to systems and methods for using three-dimensional (3D) signatures to authenticate a user when performing various tasks, such as accessing an electronic computing device. One type of 3D signature can comprise an image created in a 3D space. The image can be created using hand gestures. An alternate type of 3D signature can comprise a pattern comprised of 3D virtual objects. The alternate type of 3D object can be created by selecting one or more of the 3D virtual objects and moving, expanding, contracting and/or rotating one or more of the 3D virtual objects in a pattern known to the user.

The 3D signatures can be created in virtual space using a virtual reality (VR) electronic computing device (VR device) or an augmented reality (AR) electronic computing device (AR device). The VR device can comprise a physical device that can create a virtual reality environment for the user. The AR device can comprise a physical device that can project virtual images over a real image viewed through the AR device. In this disclosure, the VR device and AR device are also referred to as visual computing devices.

A 3D signature can be enhanced using text characters, color, shading and other enhancements. As discussed in more detail later herein, the text characters, color, shading and other enhancements can be made available from a pallet of available text characters, colors and shadings available on the VR device and on the AR device.

The systems and methods also permit a plurality of users to create a 3D signature. For example, one user can create part of the 3D signature and a second user can create another part of the 3D signature. When recreating the 3D signature, the one user can recreate a partial signature and the second user can complete the signature. This type of 3D signature can be used when signatures of a plurality of users are required—such as co-signers on a loan or a mortgage.

In an implementation using the systems and methods, the user can create a 3D signature using hand gestures or virtual objects. The 3D signature can be stored in a database. Then, when the user attempts to login to an electronic computing device that supports 3D authentication, the user can attempt to re-create the 3D signature upon login. When the re-created 3D image matches the originally created 3D image within an acceptable margin of error, the user can be authenticated at the electronic computing device.

Biometrics can also be used to provide an additional layer of security when using 3D signatures. In one example implementation a biometric retina sensing device can be added to AR device 102. For example, AR device 102 can be a wearable headset that can include a camera and retina sensing capability. The camera can focus on the eyes on the user. After the user recreates a 3D signature and is approved for login based on the 3D signature, the retinal sensing device can perform a retinal scan of the user and authenticate the user based on the retinal scan. Full login access can be granted when the identity of the user is confirmed by both the 3D signature and the retinal scan. For example, full access may comprise an ability to withdraw or transfer funds from the user's account at a financial institution. In this example, partial access, for example the ability of the user to view financial statements but not withdraw funds, can be granted with from the 3D signature alone. Other biometric means of authentication, for example one or more of finger print scans, voice recognition and facial recognition can also be used.

In addition, in some implementations, the camera can track and capture eye movements of the user when creating the 3D signature. The eye movements can be incorporated into the 3D signature and the user can be required to recreate the eye movements when recreating the 3D signature. The use of eye movement tracking can provide an additional level of security for authentication.

The systems and methods are generally described for an AR device that may be worn or carried by a user. An example of and AR device that may be worn by the user is an AR headset. An example of an AR device that may be carried by the user is a smart telephone or tablet computer that includes AR components such as a processor, display and camera and an AR software application.

The systems and methods disclosed herein are directed to a computer technology that can securely authenticate one or more users when remotely accessing an electronic computing device. The systems and methods provide an alternative to a common method of remote authentication using user IDs and passwords, which can be forgotten, lost, stolen or compromised. The systems and method permit a user to create a three-dimension signature known only to the user. The three-dimensional signature can be created using hand gestures in three-dimensional space, by the selection of one or more virtual objects in three-dimensional space or by a combination of hand gestures and virtual objects. In addition, when authentication is needed from multiple users to perform a financial transaction, such as signing for a loan, the systems and methods permit additional users to add on to an initial three-dimensional signature. The systems and methods require each user to recreate a portion of the three-dimensional signature in order to permit transactional access to the electronic computing device.

FIG. 1 shows an example system 100 that can support 3D augmented reality and virtual reality signatures. The system 100 can include an AR device 102, a VR device 104, a network 106, a server computer 108, a 3D signature database 112 and a virtual object database 114. Server computer 108 includes a signature capture and matching engine 110. More, fewer or different components are possible.

The example AR device 102 is an electronic computing device that supports augmented reality. Augmented reality is a live view of a real-world environment that is supported with computer-generated input such as sound, video and graphics. The AR device 102 can be a stand-alone device or an electronic computing device such as a smartphone or tablet computer that includes an augmented reality software application. The stand-alone AR device can comprise a headset, similar to eyeglasses, which may be worn by the user. One example of an AR headset is Google Glass, from Google Inc. of Mountain View, Calif. Another example of an AR headset is Microsoft HoloLens, from Microsoft Corporation of Redmond, Wash. More than one AR device can be used.

The headset can include a wearable computer, a camera and an optical display. The wearable computer includes a wireless telecommunication capability, permitting a wireless connection between the wearable computer and one or more server computers. The wearable computer also includes voice recognition capability, permitting the user to direct the wearable computer via voice commands. In addition, in some implementations, the wearable computer also includes biometric capability such as facial recognition, retinal scan capability, finger print and voice print capability.

The example VR device 104 is an electronic computing device that supports virtual reality. Virtual reality is a computer technology that uses images, sounds and other sensations to replicate a real environment or an imaginary setting, and simulates a user's physical presence in this environment to enable the user to interact with the replicated environment. The VR device 104 can comprise a head-mounted display, such as goggles with an eye-viewable screen, that can provide a view of the replicated environment and that can permit interaction with the replicated environment. An example VR device is Oculus Rift, from Oculus VR, LLC of Irvine, Calif. More than one VR device can be used.

The example network 106 is a computer network such as the Internet. Users of AR device 102 and VR device 102 can login to server computer 108 across network 106.

The example server computer 108 is a server computer at an institution that requires authentication of users attempting to access services provided by the server computer. In some implementations, server computer 108 is a server computer at a financial institution, such as a bank. However, the systems and methods also support server computers at other institutions that require authentication.

The example signature capture and matching engine 110 receives and captures 3D signatures from AR device 102 and from VR device 104. The 3D signature include initial 3D signatures and 3D signatures received when the user attempts to login to server computer 108. The signature capture and matching engine 110 stores the initial 3D signatures on 3D signature database 112. The signature capture and matching engine 110 also attempts to match 3D signatures received when the user attempts to login to server computer 108 with the initial 3D signatures. The signature capture and matching engine 110 determines whether the 3D signatures match to within a predetermined margin of error. When a determination is made that the 3D signatures match to within the predetermined margin of error, the signature capture and matching engine 110 authenticates the user at server computer 108.

The predetermined margin of error can be a percentage at which selected points on the 3D signature received during a login attempt differ in coordinate distance from corresponding points on the initial 3D signature. An example predetermined margin of error is 5 percent. Other percentages can be used.

The example 3D signature database 112 is an electronic data that can store 3D images provided by the signature capture and matching engine 110. More than one 3D database can be used.

The example virtual object database 114 is a database that can store virtual objects that can be accessed by the signature capture and matching engine 110 and provided to users at AR device 102 and VR device 102 when 3D signatures are created. A plurality of 3D objects can be provided of differing shapes and sizes. Some example shapes can be cubes, three-dimensional rectangles and spheres. Other shapes are possible. The virtual objects can be obtained from a pallet of available virtual objects available on AR device 102 and VR device 104. The pallet can display the available virtual objects and can permit selection of a virtual object by the user.

Figure 2:
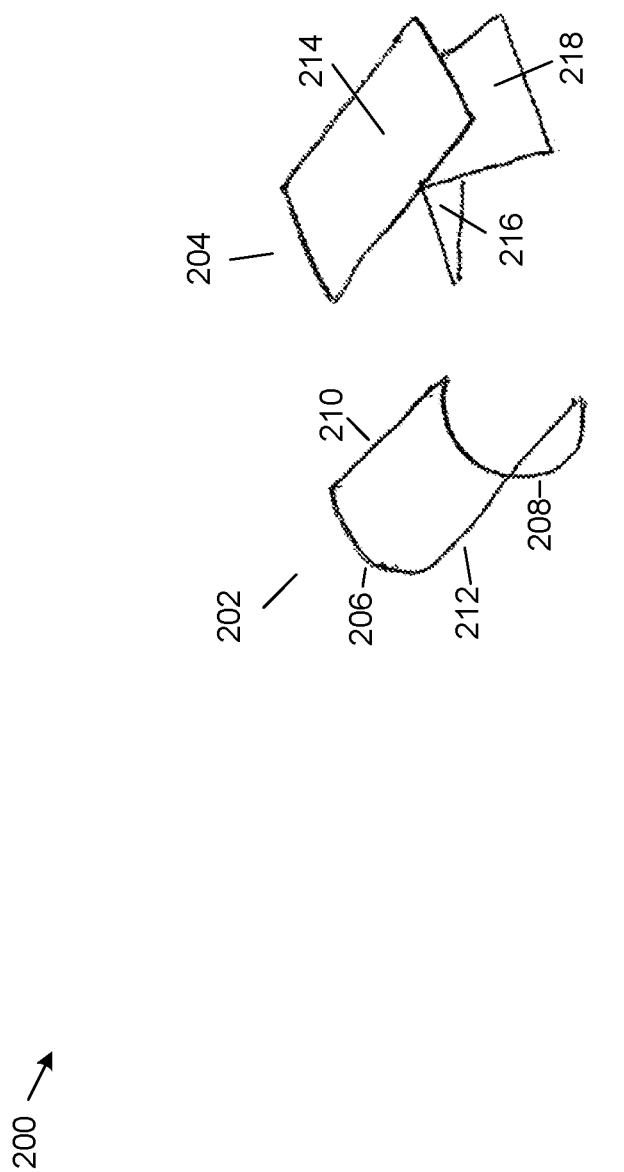
FIG. 2 shows an example three-dimensional signature.

FIG. 2 shows a two-dimensional representation of an example 3D image 200. A first part 202 the 3D image 200 comprises two curved lines 206, 208 connected at a top and bottom of each curve by straight lines 210, 212. A second part 204 of the 3D image 200 comprises an angled rectangle 214 to which two other lined segments 216, 218 are connected. The 3D image 200 can be created using hand gestures in a three-dimensional space. For example, some or all of the lines, curves and segments of 3D image 200 can include depth.

Figure 3:
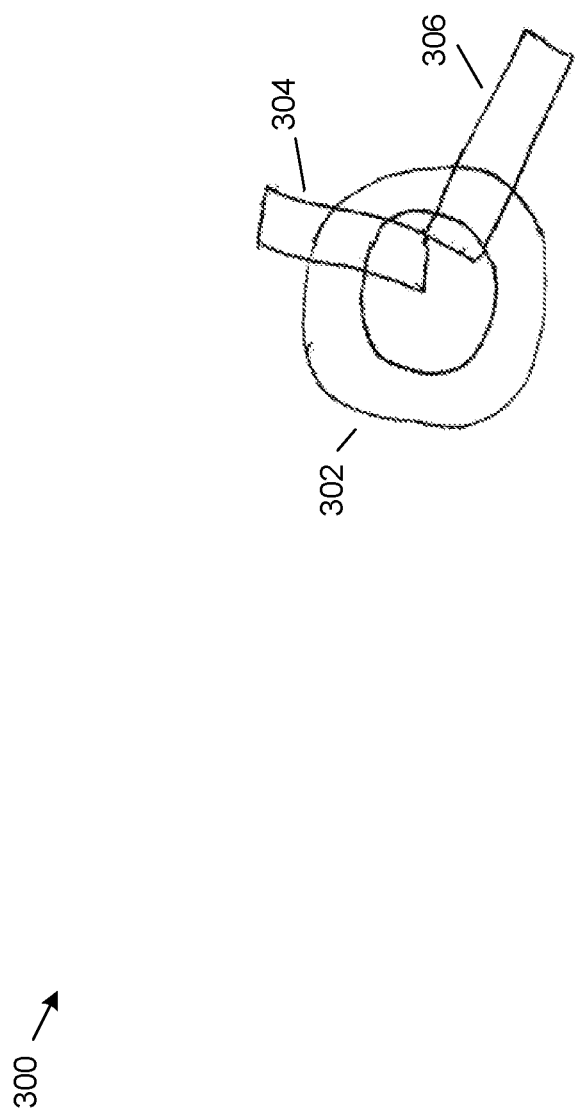
FIG. 3 shows another example three-dimensional signature.

FIG. 3 shows a two-dimensional representation of another example 3D image 300. The 3D image 300 is an example 3D representation of overlapping upper case letters "O" and "L". A first part 302 of 3D image 300 is a representation of upper case letter "O." A second part 304 and a third part 306 of 3D image 300 are representations of parts of upper case letter "L." In a manner similar to 3D image 200, 3D image 300 can be created using hand gestures in a three-dimensional space, so that the letters can include depth.

Figure 4:
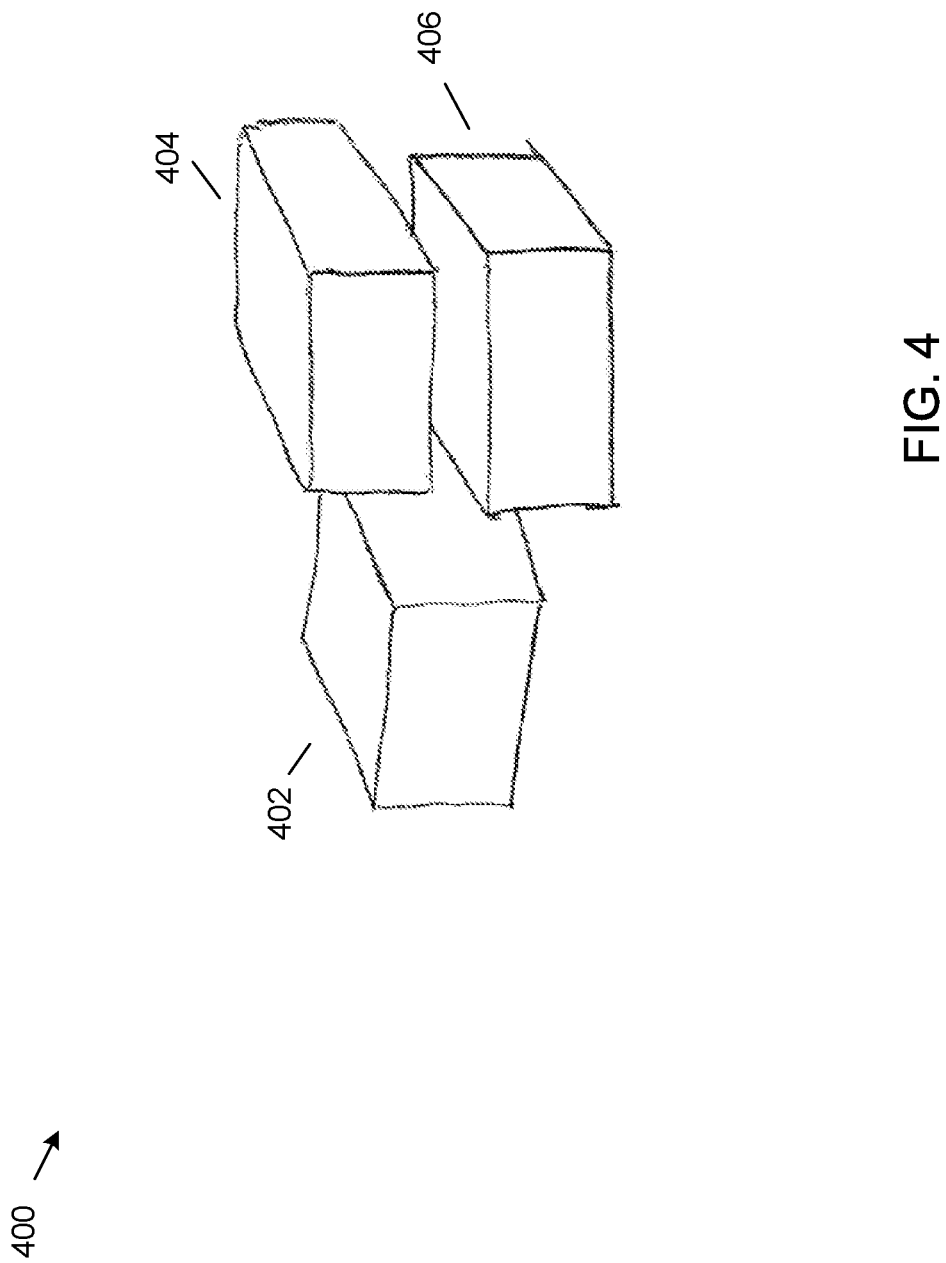
FIG. 4 shows yet another example three-dimensional signature.

FIG. 4 shows a two-dimensional representation of yet another example 3D image 400. The 3D image 400 can be created using virtual objects selected from a pallet of available virtual objects stored in a database, for example virtual object database 114. The 3D image 400 includes virtual objects 402, 404 and 406. Each virtual object 402, 404 and 406 comprises a rectangular solid that can be rotated and resized in three-dimensional space. The user can rotate and resize the virtual objects 402, 404 and 406 using hand gestures. The pallet of available virtual objects can be viewable from the user's AR device 102 or VR device 104. The user can select a virtual object 402, 404 or 406 by moving the virtual object 402, 404 or 406 from the available pallet into the three-dimensional space. Example virtual objects can include square, rectangular and round blocks, triangular and other geometric shapes and specific types of virtual objects such as unicorns. Other examples of virtual objects are possible.

Figure 5:
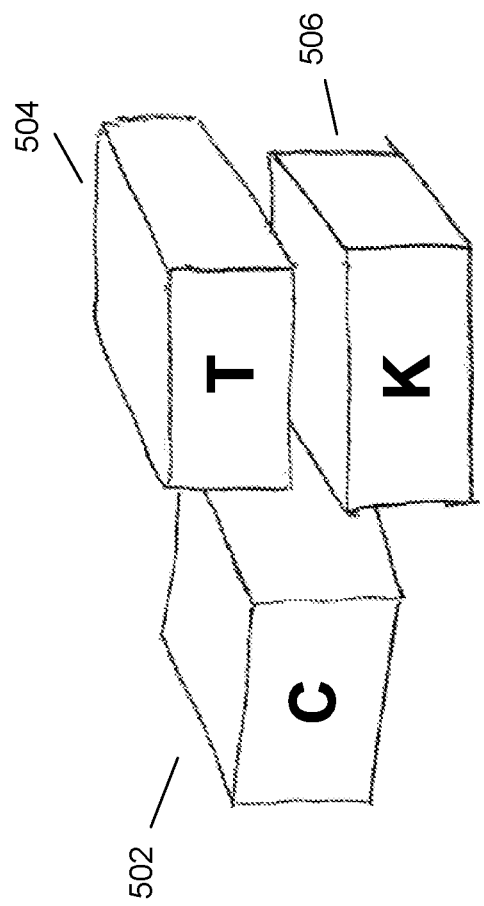
FIG. 5 shows yet another example three-dimensional signature.

FIG. 5 shows a two-dimensional representation of yet another example 3D image 500. The 3D image 500 adds identifying letters to each of virtual objects 402, 404 and 406 of 3D image 400. For example, upper case letter "C" is added to virtual object 402 to form virtual object 502, upper case letter "T" is added to virtual object 404 to form virtual object 504 and upper case letter "K" is added to virtual object 404 to form virtual object 506. The upper case letters "C", "T" and "K" can be added to virtual objects 402, 404 and 406 by selecting each virtual object 402, 404 and 406 in three-dimensional space and issuing a voice command corresponding to the upper case letter to be added. Other ways of adding letters to virtual objects are possible. The 3D image 500 can comprise a unique 3D signature for the user.

Figure 6:
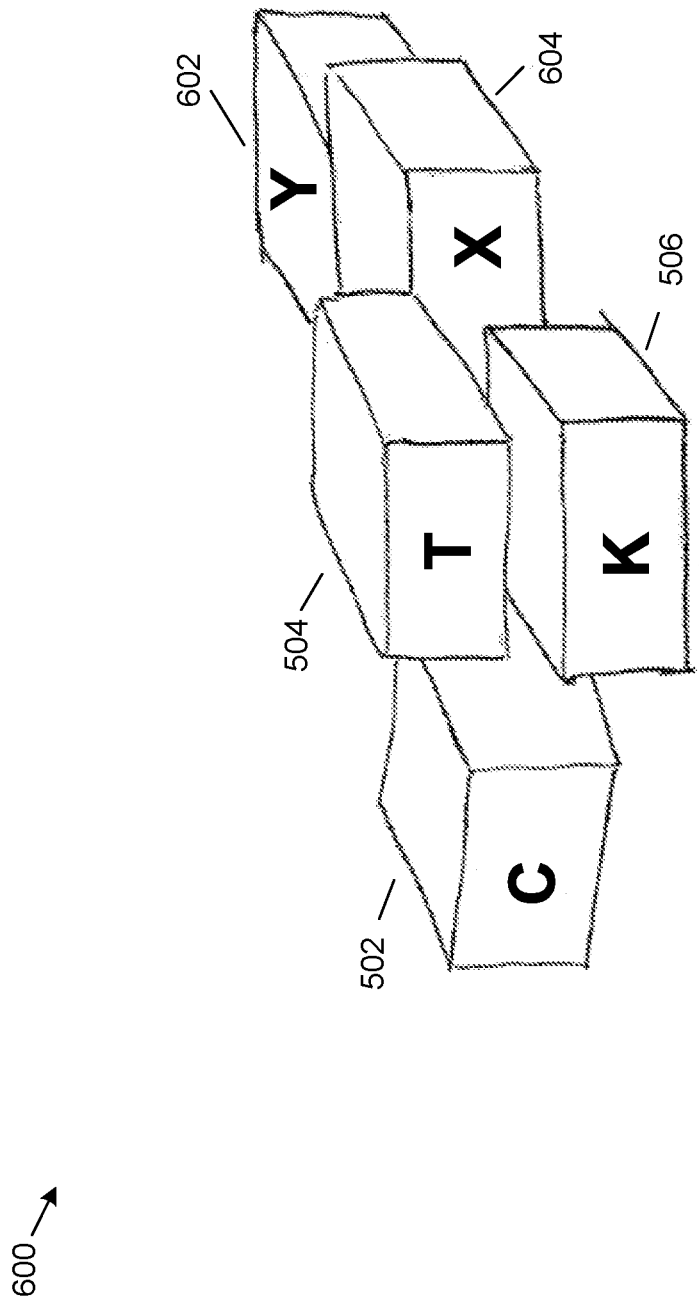
FIG. 6 shows yet another example three-dimensional signature.

FIG. 6 shows a two-dimensional representation of yet another example 3D image 600. The 3D image 600 adds additional virtual objects 602, 604 to 3D image 500. The additional virtual objects 602, 604 can be added by a second user from the pallet of available virtual objects and by selecting an adding an upper case letter to the virtual objects selected by the second user.

A combination of virtual objects 502, 504, 506 and virtual objects 602, 604 can comprise a signature of two users. For example when two signatures are needed for a financial document, each of the two users can sign the financial document separately in three-dimensional space. For example, the user (first user) can add virtual objects 502, 504 and 506 and the second user can add virtual objects 602 and 604.

In addition, color and/or shading can be added to one or more virtual objects of 3D images 400, 500 and 600. The color or shading can be selected from a pallet of available colors and shadings and added via a voice command. The pallet of available colors and shadings can be viewed in virtual space from a menu of available colors and shadings. The pallet can be displayed in virtual space by tapping on a menu item or by a voice command.

Figure 7:
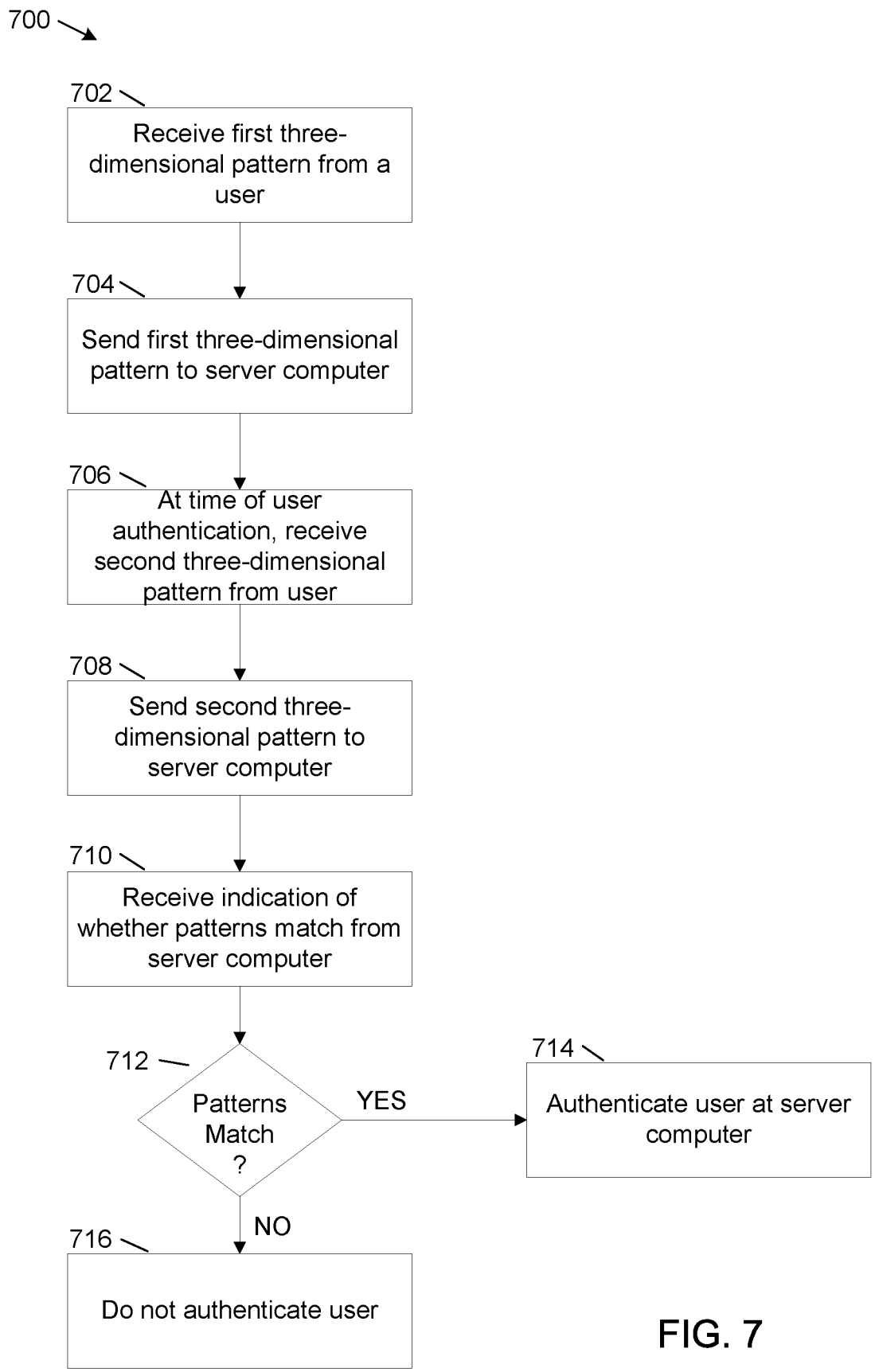
FIG. 7 shows a method for authenticating a user at a server computer of FIG. 1.

FIG. 7 shows a flowchart of an example method 700 for authenticating a user at a server computer based on a match of a three-dimensional pattern created by the user. For method 700, the three-dimensional pattern is created in conjunction with a visual computing device, such as an AR device, for example AR device 102, or a VR device, for example VR device 104.

At operation 702, a first three-dimensional pattern is received at the AR or VR device. The three-dimensional pattern can be created using hand gestures, virtual objects or a combination of hand gestures and virtual objects. The first three-dimensional pattern is created by a user of the AR or VR device and captured by a camera on the AR or VR device. The camera sends an image of the three-dimensional pattern to the AR or VR device where the image is received.

At operation 704, the first three-dimensional pattern is sent to a server computer, for example server computer 108. The server computer can be a server computer that hosts an application that requires authentication of the user before permitting access to the application. For example, the application can be a financial application of a financial institution such as a bank. Authentication of the user is required before the user can login to the application and access financial account information.

At operation 706, at a time of user authentication, for example when the user logs in to the server computer, a second three-dimensional pattern is received at the server computer. The second three-dimensional pattern represents an attempt by the user to recreate the first three-dimensional pattern.

At operation 708, the second three-dimensional pattern is sent to the server computer.

At operation 710, an indication is received from the server computer as to whether the second three-dimensional pattern matches the first three-dimensional pattern within a predetermined margin of error. For example, the server computer can compare segments of the second three-dimensional pattern with corresponding segments of the first three-dimensional pattern and determine a percentage for which each segment of the second three-dimensional pattern deviates from the corresponding segment of the first three-dimensional pattern. An overall percentage of deviation can be calculated and when this overall percentage of deviation is less than a percentage corresponding to the predetermined margin of error, the user can be authenticated. An example predetermined margin of error is 5%, although other percentages can be used.

At operation 712, when a determination is made that the patterns match within the predetermined margin of error, at operation 714, the user is authenticated at the server computer.

At operation 712, when a determination is made that the patterns do not match within the predetermined margin of error, at operation 716 the user is not authenticated. In some implementations the server computer can send a message to the AR or VR device to inform the user that the authentication failed and request the user to attempt to recreate the first three-dimensional pattern again.

Figure 8:
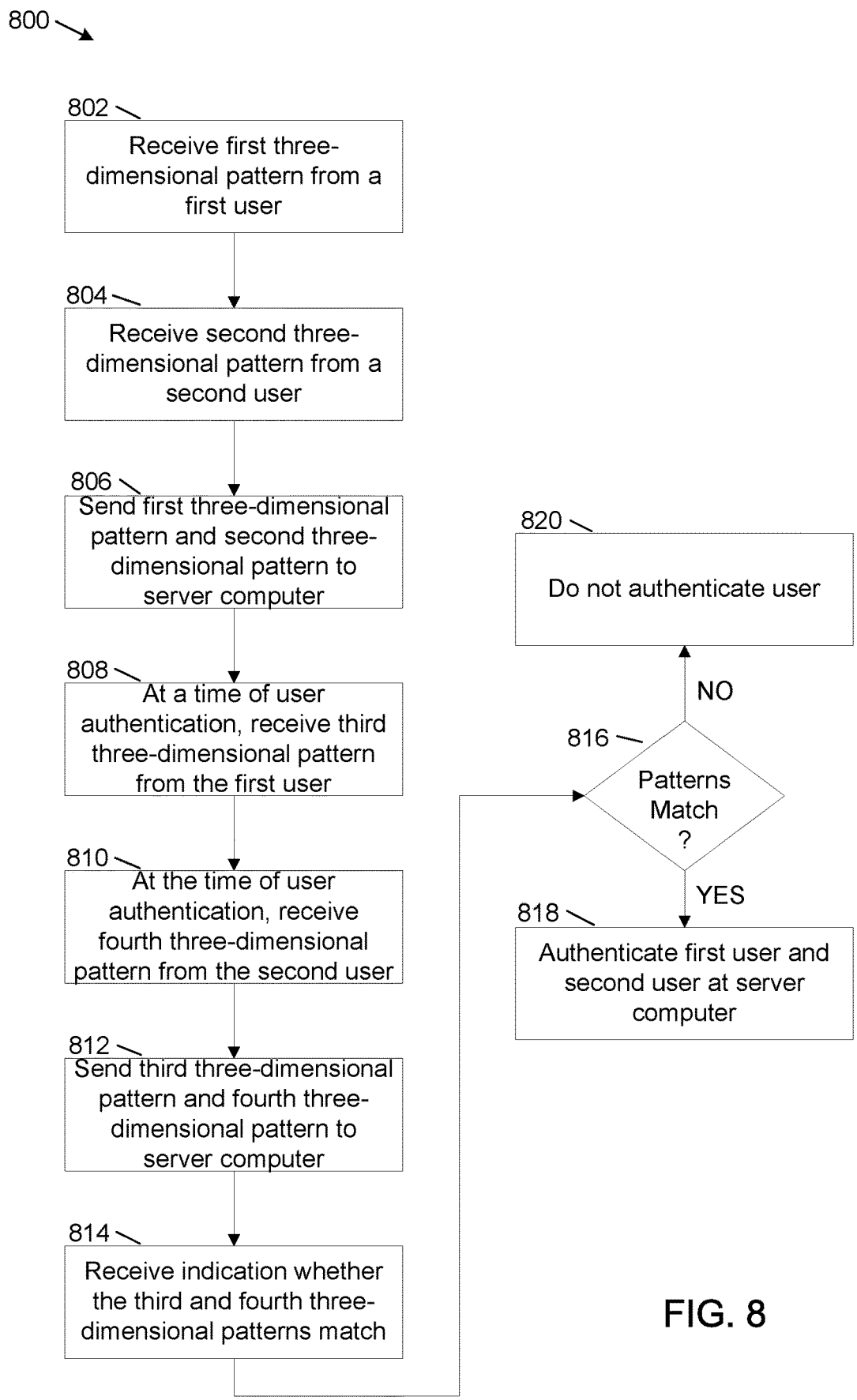
FIG. 8 shows a method for authenticating a user at the server computer of FIG. 1.

FIG. 8 shows a flowchart of an example method 800 for authenticating two users at a server computer based on a match of three-dimensional patterns created by the two users. Method 800 can be used for example when signatures of two users are needed to authorize a financial transaction, for example when two signatures are needed for a personal loan or a mortgage. For method 800, the three-dimensional pattern is created in conjunction with an AR device, for example AR device 102 or a VR device, for example VR device 104.

At operation 802, a first three-dimensional pattern is received from a first user. The first three-dimensional pattern is created by the first user in three-dimensional space using the AR or VR device. The first three-dimensional pattern is created using hand gestures, virtual objects or a combination of hand gestures and virtual objects.

At operation 804, a second three-dimensional pattern is received from a second user. The second three-dimensional pattern is created by the second user in three-dimensional space, typically using a different AR or VR device than the first user. The second three-dimensional pattern is typically created by the second user by obtaining the first three-dimensional pattern from the server computer and then adding additional line segments or virtual objects to the first three-dimensional pattern. The additional line segments are created by hand gestures of the second user.

At operation 806 the first three-dimensional pattern and the second three-dimensional pattern are sent to the server computer.

At operation 808, at a time of user authentication, a third three-dimensional pattern is received from the first user. The third three-dimensional pattern is an attempt by the first user to re-create the first three-dimensional pattern.

At operation 810, at the time of user authentication, a fourth three-dimensional pattern is received from the second user. The fourth three-dimensional pattern is an attempt by the second user to re-create the second three-dimensional pattern.

At operation 812, the third three-dimensional pattern and the fourth three-dimensional pattern are sent to the server computer.

At operation 814, an indication is received from the server computer as to whether the third three-dimensional pattern matches the fourth three-dimensional pattern within a predetermined margin of error.

At operation 816, when a determination is made that the third three-dimensional pattern matches the fourth three-dimensional pattern within the predetermined margin of error, at operation 818, the first user and the second user are authenticated at the server computer.

At operation 816, when a determination is made that the third three-dimensional pattern does not match the fourth three-dimensional pattern within the predetermined margin of error at operation 820, the first user and the second user are not authenticated at the server computer.

In some implementations, when the third three-dimensional pattern does not match the fourth three-dimensional pattern within the predetermined margin of error, the server computer can send another indication indicating whether the first three-dimensional pattern matches the third three-dimensional pattern. When the first three-dimensional pattern does not match the second third three-dimensional pattern, the server computer can send a notification to the first user to recreate the third three-dimensional pattern. However, when the first three-dimensional pattern matches the third three-dimensional pattern, the server computer can send a notification to the second user to recreate the fourth three-dimensional pattern.

Figure 9:
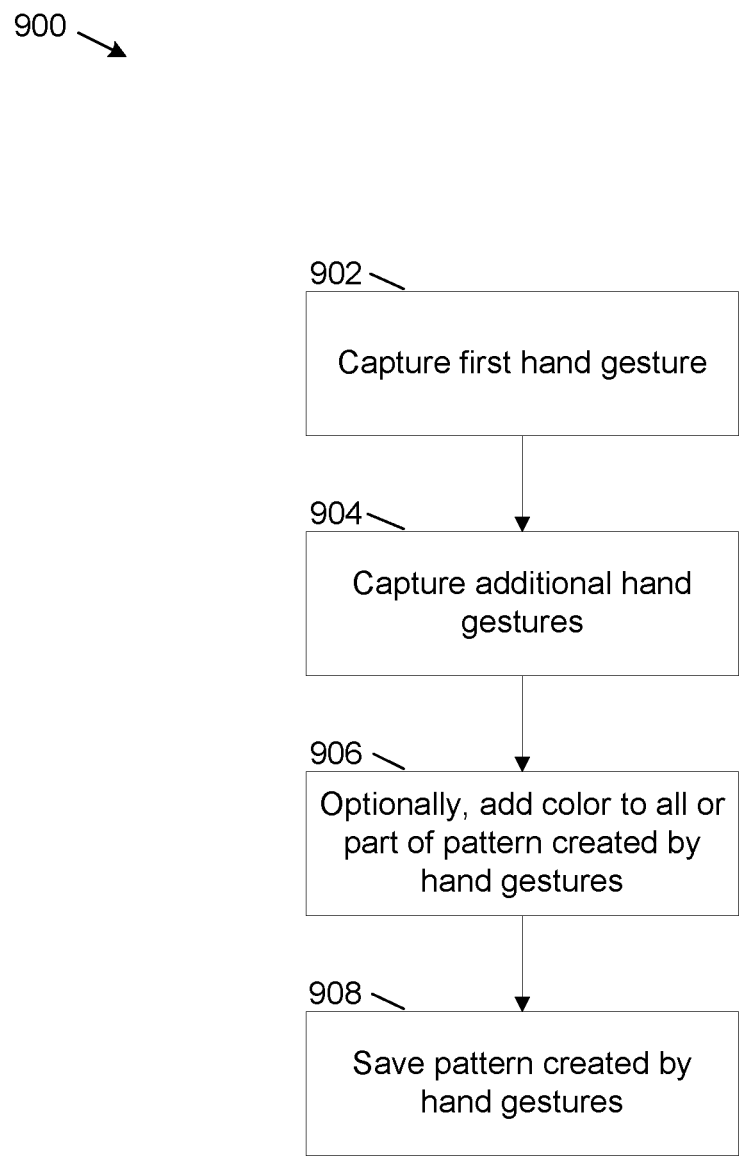
FIG. 9 shows another method for authenticating a user at the server computer of FIG. 1.

FIG. 9 shows a flowchart of an example method 900 for creating a three-dimensional pattern at an AR or VR device using hand gestures.

At operation 902, a first hand gesture of a user is captured by a camera at the AR or VR device and received at the AR or VR device. The first hand gesture is typically a hand sweep in three-dimensional space that is received as a straight or curved line segment at the AR or VR device. For example, a first hand gesture corresponding to a straight line in three-dimensional space is received as a straight line segment and a first and gesture corresponding to a curved line in space is received as a curved line segment.

At operation 904, one or more additional hand gestures of the user are captured and received at the AR or VR device. One or more of the additional hand gestures typically start from part of a line segment created by a previous hand gesture so that at least two resultant line segments are contiguous. The one or more additional hand gestures are received as straight or curved line segments at the AR or VR device.

At operation 906, color is optionally added to all or part of a pattern created by the hand gestures of operations 902 and 904. The color can be selected by selecting a line segment of the pattern and then selecting a color from a pallet of colors that can be viewed on and selected from the AR or VR device.

At operation 908, the pattern created by the hand gestures of operations 902, 904 and color optionally added at operation 906 is saved at the AR or VR device. The pattern is then sent to the server computer.

Figure 10:
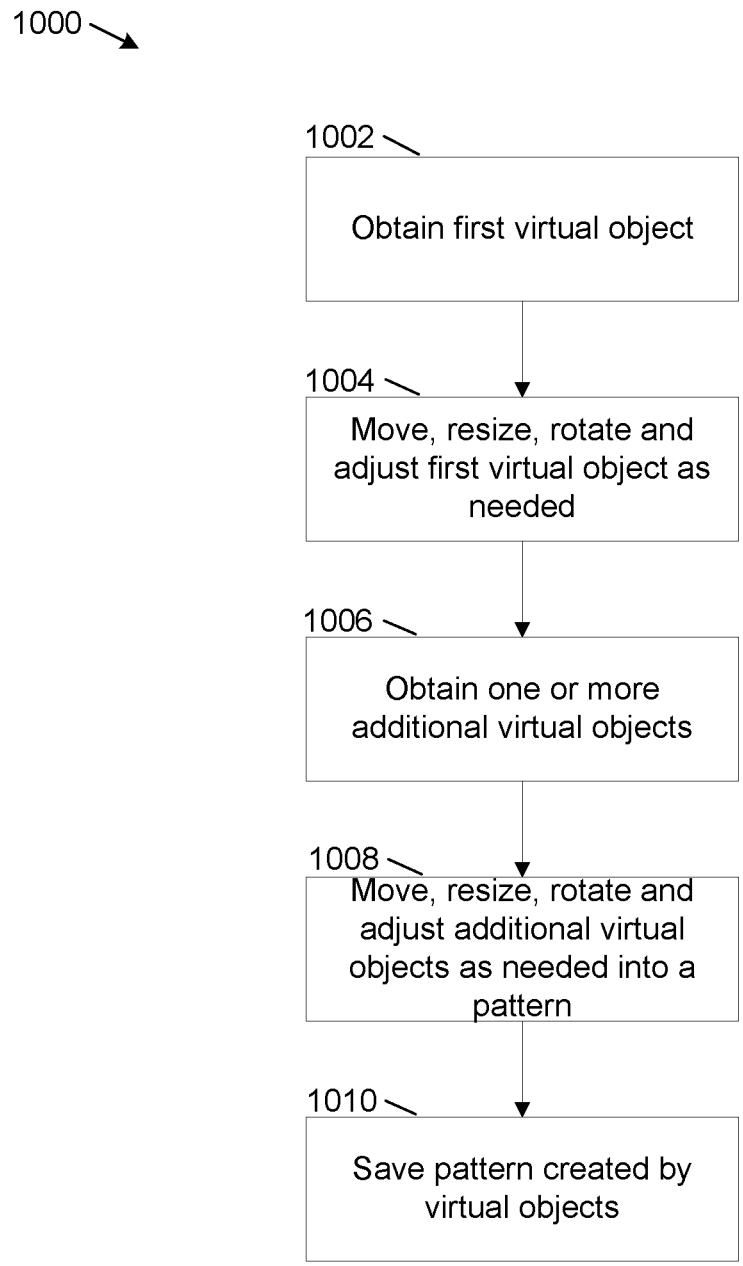
FIG. 10 shows a method for creating a three-dimensional pattern using hand gestures.

FIG. 10 shows a flowchart of an example method 1000 for creating a three-dimensional pattern at an AR or VR device using virtual objects.

At operation 1002, a first virtual object is obtained at the AR or VR device. The first virtual object is obtained from a pallet or menu of virtual objects that can be selected at the AR or VR device and dragged into three-dimensional space viewable on the AR or VR device.

At operation 1004, the first virtual object is moved, resized, rotated and adjusted in three-dimensional space to size and position the first virtual object to the liking of the user. Example virtual objects can include a cube, a rectangular solid, a sphere, an oblong and a triangular solid. Other virtual objects, including virtual representation of physical objects such as an automobile and a unicorn are possible.

At operation 1006, one or more additional virtual objects are obtained from the pallet or menu of virtual objects at the AR or VR device.

At operation 1008, the one or more additional virtual objects are moved, resized, rotated and adjusted to the likability of the user. One or more of the additional virtual objects can be contiguous to all or part of one or more previously added virtual objects.

At operation 1010, a pattern created by the virtual objects of operations 1002-1008 are saved at the AR or VR device. The pattern is then sent to the server computer.

Figure 11:
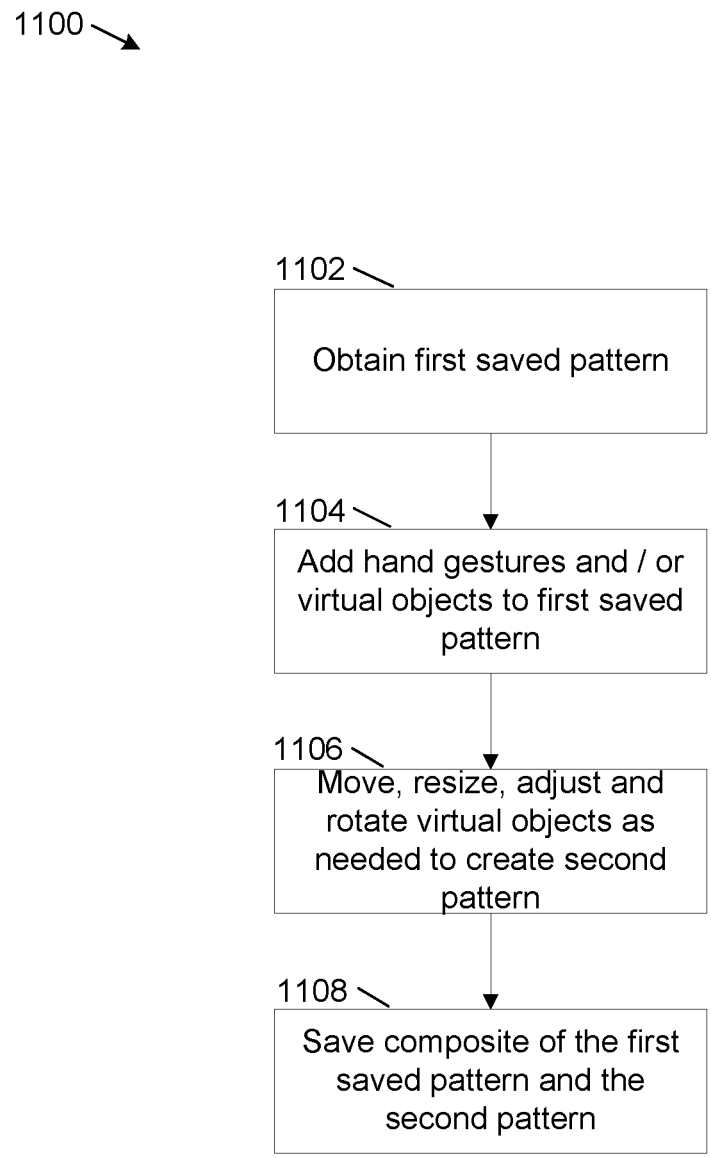
FIG. 11 shows a method for creating a three-dimensional pattern using virtual objects.

FIG. 11 shows a flowchart of an example method 1100 for adding a second three-dimensional pattern at an AR or VR device to a previously created three-dimensional pattern. The previously three-dimensional pattern is created by a first user. The second three-dimensional pattern is created by a second user, typically on a different AR or VR device than used by the first user.

At operation 1102, the first three-dimensional pattern is obtained at the AR or VR device. The first three-dimensional pattern can be obtained from a database, for example from 3D signature database 112. The first three-dimensional pattern is saved in the database after creation by the first user.

At operation 1104, the second user adds hand gestures and/or virtual objects to the first three-dimensional pattern. The added hand gestures and/or virtual objects comprise a second three-dimensional pattern created by the second user.

The second user can move, resize, adjust and rotate the virtual objects as needed to create the second three-dimensional pattern. Typically, the second user moves one or more of the virtual objects so that at least one of the virtual objects is contiguous to a line segment or a virtual object of the first three-dimensional pattern.

At operation 1106, when the second user has completed the second three-dimensional pattern, the second user saves the composite pattern comprising the first three-dimensional pattern and the second three-dimensional pattern.

As illustrated in the example of FIG. 12, server computer 108 includes at least one central processing unit ("CPU") 1202, a system memory 1208, and a system bus 1222 that couples the system memory 1208 to the CPU 1202. The system memory 1208 includes a random access memory ("RAM") 1210 and a read-only memory ("ROM") 1212. A basic input/output system that contains the basic routines that help to transfer information between elements within the server computer 108, such as during startup, is stored in the ROM 1212. The server computer 108 further includes a mass storage device 1214. The mass storage device 1214 is able to store software instructions and data. Some or all of the components of the server computer 108 can also be included in AR device 102 and VR device 104.

The mass storage device 1214 is connected to the CPU 1202 through a mass storage controller (not shown) connected to the system bus 1222. The mass storage device 1214 and its associated computer-readable data storage media provide non-volatile, non-transitory storage for the server computer 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 108.

According to various embodiments of the invention, the server computer 108 may operate in a networked environment using logical connections to remote network devices through the network 1220, such as a wireless network, the Internet, or another type of network. The server computer 108 may connect to the network 1220 through a network interface unit 1204 connected to the system bus 1222. It should be appreciated that the network interface unit 1204 may also be utilized to connect to other types of networks and remote computing systems. The server computer 108 also includes an input/output controller 1206 for receiving and processing input from a number of other devices, including a touch user interface display screen, or another type of input device. Similarly, the input/output controller 1206 may provide output to a touch user interface display screen or other type of output device.

As mentioned briefly above, the mass storage device 1214 and the RAM 1210 of the server computer 108 can store software instructions and data. The software instructions include an operating system 1218 suitable for controlling the operation of the server computer 108. The mass storage device 1214 and/or the RAM 1210 also store software instructions, that when executed by the CPU 1202, cause the server computer 108 to provide the functionality of the server computer 108 discussed in this document. For example, the mass storage device 1214 and/or the RAM 1210 can store software instructions that, when executed by the CPU 1202, cause the server computer 108 to display received data on the display screen of the server computer 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a visual computing device to authenticate one or more users, the method comprising:
   using the visual computing device, receiving a first three-dimensional pattern from a first user;
   sending the first three-dimensional pattern to a server computer;
   at a time of user authentication, receiving a second three-dimensional pattern from the first user;
   sending the second three-dimensional pattern to the server computer;
   receiving an indication from the server computer as to whether the first three-dimensional pattern matches the second three-dimensional pattern within a margin of error;
   when the first three-dimensional pattern matches the second three-dimensional pattern within the margin of error, authenticating the first user at the server computer;
   when the first three-dimensional pattern does not match the second three-dimensional pattern within the margin of error, preventing authentication of the first user at the server computer;
   receiving first additions to the first three-dimensional pattern from a second user;
   modifying the first three-dimensional pattern based on the received first additions to create a third three-dimensional pattern; and
   sending the third three-dimensional pattern to the server computer.

2. The method of claim 1, further comprising receiving hand gestures from the first user representing the first three-dimensional pattern and the second three-dimensional.

3. The method of claim 2, further comprising receiving a plurality of line segments for the first three-dimensional pattern and the second three-dimensional pattern, at least two of the plurality of line segments being connected to each other.

4. The method of claim 3, further comprising receiving at least one straight line segment and at least one curved line segment.

5. The method of claim 1, further comprising receiving hand gestures representing the first three-dimensional pattern that comprise a signature from the first user.

6. The method of claim 5, further comprising receiving eye movements of the first user that are tracked and captured by the visual computing device, the eye movements being used to create the first three-dimensional pattern.

7. The method of claim 1, further comprising receiving one or more virtual objects, the one or more virtual objects being used to create the first three-dimensional pattern.

8. The method of claim 7, further comprising receiving a rotation and/or resizing of the one or more virtual objects, the rotation and/or resizing of the one or more virtual objects being used to create the first three-dimensional pattern.

9. The method of claim 7, further comprising receiving one or more virtual objects of one or more shapes of different sizes and complexities.

10. The method of claim 7, further comprising adding one or more alphanumeric characters to one or more of the virtual objects.

11. The method of claim 1, further comprising adding color to the first three-dimensional pattern.

12. The method of claim 1, further comprising, at the time of user authentication:
    receiving second additions to the second three-dimensional pattern from the second user;
    modifying the second three-dimensional pattern based on the received second additions to create a fourth three-dimensional pattern; and
    sending the fourth three-dimensional pattern to the server computer.

13. The method of claim 12, further comprising: when the third three-dimensional pattern matches the fourth three-dimensional pattern within the margin of error, permit both the first user and the second user to login to the server computer.

* * * * *